(12) United States Patent
Kamiyama et al.

(10) Patent No.: US 7,083,360 B2
(45) Date of Patent: Aug. 1, 2006

(54) METHOD FOR REHABILITATING AN EXISTING PIPE

(75) Inventors: Takao Kamiyama, Hiratsuka (JP); Koji Kaneta, Hiratsuka (JP); Kenji Fujii, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 0 days.

(21) Appl. No.: 11/109,044

(22) Filed: Apr. 19, 2005

(65) Prior Publication Data

US 2005/0238437 A1  Oct. 27, 2005

(30) Foreign Application Priority Data

Apr. 22, 2004  (JP)  ............................. 2004-126210

(51) Int. Cl.
    *F16L 55/18*  (2006.01)
(52) U.S. Cl. ................................. 405/184.1; 405/184.2
(58) Field of Classification Search ............ 405/184.2, 405/133, 184.1; 52/20
    See application file for complete search history.

(56) References Cited

U.S. PATENT DOCUMENTS

| | | | | | |
|---|---|---|---|---|---|
| 2,166,632 | A | * | 7/1939 | Hardesty et al. | ............. 405/133 |
| 4,089,139 | A | * | 5/1978 | Moffa et al. | ..................... 52/20 |
| 5,081,802 | A | * | 1/1992 | Westhoff et al. | ................ 52/20 |
| 5,383,311 | A | * | 1/1995 | Strickland | ....................... 52/20 |
| 5,388,929 | A | * | 2/1995 | Molyneux | ................. 405/184.2 |
| 5,608,998 | A | * | 3/1997 | Hume | ............................ 52/20 |

FOREIGN PATENT DOCUMENTS

| | | | |
|---|---|---|---|
| EP | 787861 | * | 6/1997 |
| JP | 9-13410 | * | 1/1997 |

\* cited by examiner

*Primary Examiner*—Frederick L. Lagman
(74) *Attorney, Agent, or Firm*—Adams & Wilks

(57) ABSTRACT

Segments are successively coupled in the circumferential direction and the vertical direction to provide a rehabilitating pipe that rehabilitates an exiting pipe such as a manhole extending in the vertical direction. The segments are coupled in the vertical direction by stacking segments on previously assembled segments. A gap between the existing pipe and the rehabilitating pipe is filled with a filler after completion of the assembly as a rehabilitating pipe. The filler is hardened to integrate the rehabilitating pipe with the existing pipe as a compound pipe. With such an arrangement, the rehabilitating pipe can be laid by a simple method because the segments can be stacked on previously assembled segments using the segments' own weight.

12 Claims, 11 Drawing Sheets

US 7,083,360 B2

METHOD FOR REHABILITATING AN EXISTING PIPE

BACKGROUND OF THE INVENTION

1. Field of the Invention

The present invention relates to a method for rehabilitating an existing pipe, and more specifically to a method for rehabilitating an existing pipe, wherein segments are coupled in circumferential and vertical directions, and laid as a rehabilitating pipe inside the vertically extending existing pipe, such as a manhole.

2. Description of the Prior Art

A method of rehabilitating a vertically extending existing pipe, such as a manhole, is known from Japanese Patent Laid Open Publication No. 1996-150659. This discloses a method that rehabilitates a manhole by lining the inner circumferential surface of the manhole by inserting into the manhole a lining material comprising a pipe shaped flexible resin absorbing material impregnated with a liquid setting resin. The lining material is pressed against the inner circumferential surface of the manhole by the pressure of a fluid, such as water, so that it takes a shape identical to the inner circumferential surface of the manhole. The setting resin is then cured to provide a rehabilitating pipe for the manhole.

In such a method, the lining material is inserted into the manhole, extending across the entire length thereof and the inner surface of the manhole is lined all at once; therefore, although the lining can be completed in a short period of time, there is a disadvantage in that the rehabilitation work cannot be carried out while viewing the appearance of the inner wall surface of the manhole and repetitively performing partial repairs.

Japanese Patent Laid Open Publication No. 2003-286742 discloses a method that rehabilitates an existing pipe by successively coupling segments in the circumferential direction and in the pipe longitudinal direction. One segment comprises two side plates and two end plates that are integrally provided upright at a prescribed height on an inner plate. In this method, the entirety can be repaired while performing partial repairs, but there is the disadvantage in that all segments must be coupled during assembly in the circumferential direction and in the pipe longitudinal direction using a coupling means, thereby complicating the pipe laying.

It is therefore an object of the present invention to provide a method for rehabilitating a vertically extending existing pipe such as a manhole, enabling, with a simple constitution, the successive repair of the existing pipe while viewing the state of an inner wall surface thereof.

SUMMARY OF THE INVENTION

According to the present invention, a method for rehabilitating an existing pipe that extends in the vertical direction, comprises preparing segments each of which is integrally formed of plastic from an inner plate having an inner surface that is flat or curved with a prescribed curvature, two side plates provided upright on each side edge of the inner plate, and two end plates provided upright on each end edge of the inner plate; successively coupling the segments in the circumferential direction and in the vertical direction, the segments being coupled in the vertical direction by stacking a segment on an underlying segment; and filling, after assembly as a rehabilitating pipe, a gap between the existing pipe and the rehabilitating pipe with a filler for integration with the existing pipe.

The present invention can assemble a rehabilitating pipe by using the weight of the segments themselves and stacking each segment on an already assembled segment, and can therefore reliably rehabilitate an existing pipe with a simple method.

Further features of the invention, its nature and various advantages will be more apparent from the accompanying drawings and following detailed description of the invention.

DESCRIPTION OF THE PREFERRED EMBODIMENTS

The present invention will be described based on preferred embodiments, referring to the attached drawings.

Although a method that repairs or rehabilitates a manhole is explained herein, the present invention is not limited to a manhole, and can also be applied in cases wherein a pipe extends in a direction perpendicular (vertical direction) to the ground. In addition, although the explanation is for a case wherein the cross-sectional shape orthogonal to the vertical direction of the manhole is rectangular, it is understood that the present invention can also be applied to a manhole having a circular cross-sectional shape.

Figure 1:
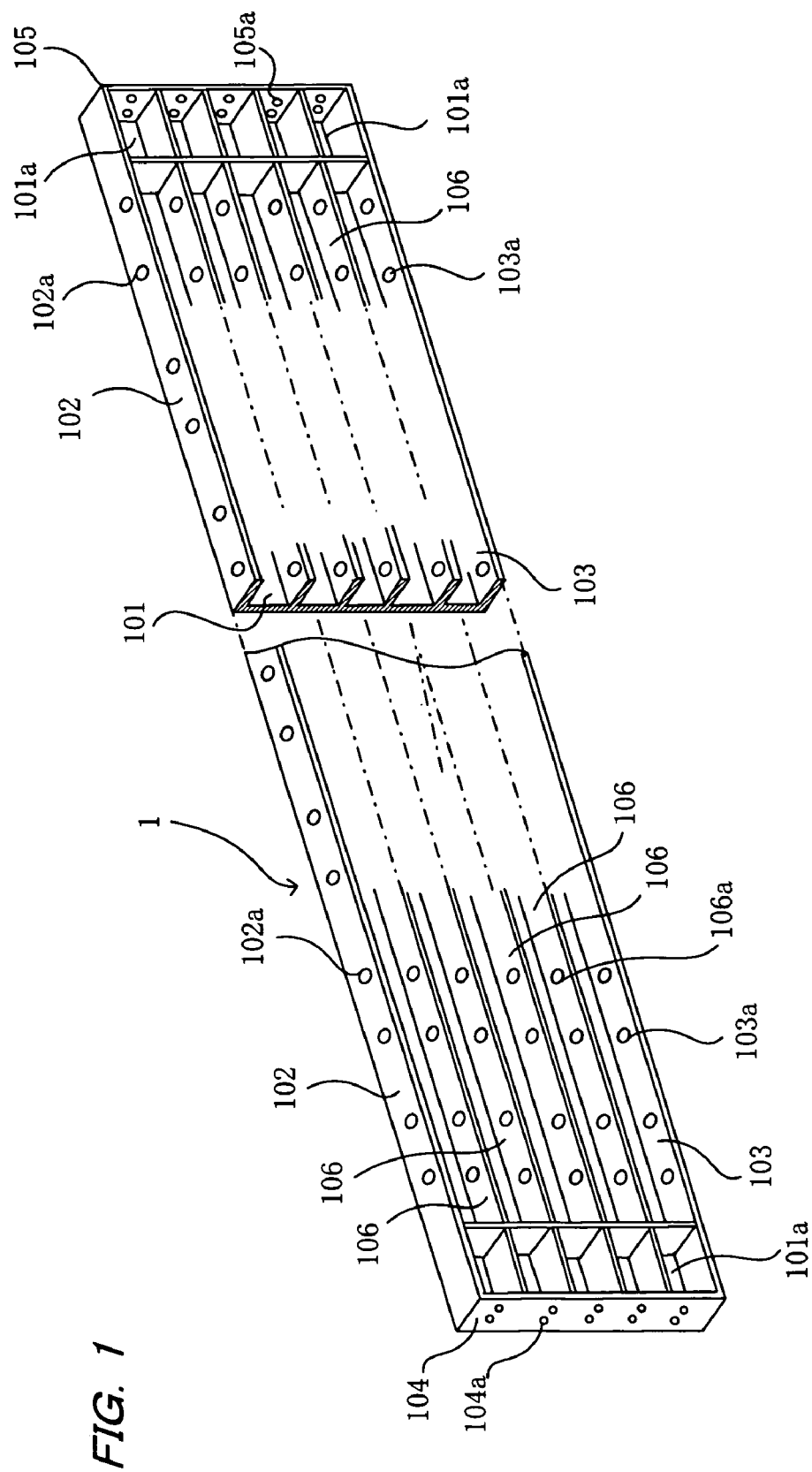
FIG. 1 is a perspective view partially and schematically showing a parallelepipedic segment
Figure 2:
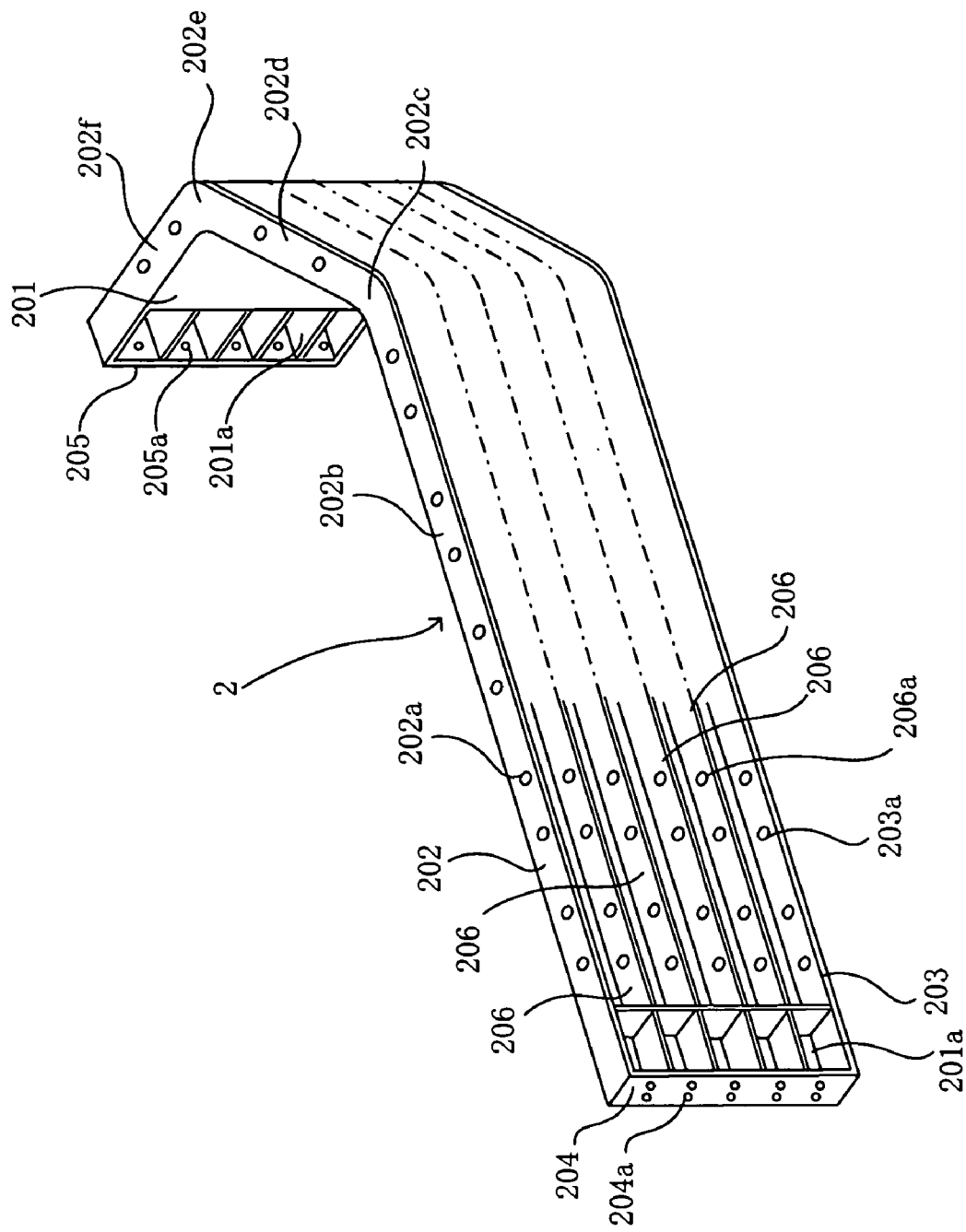
FIG. 2 is a perspective view partially and schematically showing a bent segment.

The manhole is rehabilitated by coupling segments in the circumferential direction (direction level with the ground) and in the vertical direction orthogonal to the circumferential direction One segment is as shown in FIG. 1 and FIG. 2 and serves as a rehabilitating or repairing member.

The segment 1 shown in FIG. 1 is formed as a rectangular parallelepiped block, wherein an inner plate 101, side plates 102, 103, end plates 104, 105, and a plurality of reinforcing plates 106 are integrally molded from a transparent, semi-transparent, or opaque plastic. Vinyl chloride, ABS, DuraStar polymer (trade name), and the like are used as the transparent plastic. PVC, polyethylene, and the like are used as the semitransparent plastic. PVC, polyester, ABS, polyethylene, polypropylene, and the like are used as the opaque plastic.

The inner plate 101 is formed as a flat plate having a flat inner surface of a prescribed width and a prescribed length, and the inner surface thereof forms the inner wall surface of the rehabilitating pipe assembled. A plurality of rectangular openings 101a is formed respectively on each of both end parts of the inner plate 101 for performing from the inside the work in order to mutually couple the segments 1 in the circumferential direction.

The side plates 102, 103 are provided upright at a prescribed height on both side edge parts of the upper surface of the inner plate 101. A plurality of through holes 102a, 103a (herein, 14) is formed respectively in the side plates 102, 103 at a prescribed interval for passing therethrough coupling members to couple the segments in the vertical direction (pipe longitudinal direction), as is discussed later.

The end plates 104, 105 are provided upright at both end edge parts on the upper surface of the inner plate 101 at a height the same as the side plates. Through holes 104a, 105a are respectively formed at a plurality of locations in the end plates 104, 105 for inserting therethrough bolts that mutually couple the segments 1 in the circumferential direction.

The reinforcing plates 106 reinforce the mechanical strength of the entire segment 1, and extend at a prescribed height in a direction orthogonal to the surface of the inner plate 101 on the inner side of the side plates 102, 103. The length of each reinforcing plate 106 is the same as the height of the side plates and the end plates, but some reinforcing plates can be made shorter than that. In addition, a plurality of through holes 106a is formed in the reinforcing plates 106, for inserting the coupling members therethrough in the vertical direction, at a position corresponding to each of the aligned through holes 102a, 103a of the respective side plates 102, 103. In addition, although not illustrated in FIG. 1, a plurality of protruding plates having a rib structure that protrudes in the lateral direction is formed on the inner surfaces of the side plates 102, 103 and on both side surfaces of the reinforcing plates 106 to enhance the strength of the segment 1.

FIG. 2 shows a segment 2 that is arranged at a corner of the manhole. The basic constitution is the same as the segment 1 in FIG. 1, comprising an inner plate 201, side plates 202, 203, end plates 204, 205, and a plurality of reinforcing plates 206 respectively corresponding to the inner plate 101, the side plates 102, 103, the end plates 104, 105, and the reinforcing plates 106 of the segment 1; further, the respective inner plate, all of the side plates, all of the end plates, and all of the reinforcing plates are integrally formed, and are of the same material as the segment 1.

In contrast to the segment 1, which is a block that extends linearly, the segment 2 is a block that is bent at an angle of 90°, e.g., a side plate 202 has a long linear part 202b, is then bent at approximately 45° at a bent part 202c, continues as a linear part 202d, is then bent at approximately 45° in the same direction at a bent part 202e, and then continues as a short linear part 202f. Accordingly, the angle formed by the directions in which the linear parts 202b and 202f extend is a right angle. Another side plate 203, the inner plate 201, and the reinforcing plates 206 are also bent corresponding thereto, and their entirety forms a bent structure. Openings 201a for performing the work of respectively coupling the segments in the circumferential direction are formed at both end parts of the inner plate 201, and through holes 202a, 203a for inserting therethrough coupling members in the vertical direction are formed in the respective side plates 202, 203; in addition, through holes 204a, 205a for inserting therethrough bolts that couple the segments in the circumferential direction are respectively formed in the end plates 204, 205, the same as the segment 1.

The segment positioned at the corner of the manhole can also be an arcuately shaped member, instead of the shape shown in FIG. 2. Such a segment is obtained when a circular pipe is sliced at a prescribed width perpendicular to the pipe longitudinal direction, and the sliced pipe is then partitioned in the circumferential direction in equal parts.

When the segments 1 and 2 are successively coupled in the circumferential direction in end-to-end relation with the end plates of the segments mutually aligned and the inner surfaces of every inner plate aligned, a short pipe unit can be assembled having a prescribed length, closed in the circumferential direction. The segments are further coupled successively in the pipe longitudinal direction to assemble a rehabilitating pipe with its inner wall surface uniform without any gap.

The following explains a method of rehabilitating a manhole, using the abovementioned segments.

Figure 3:
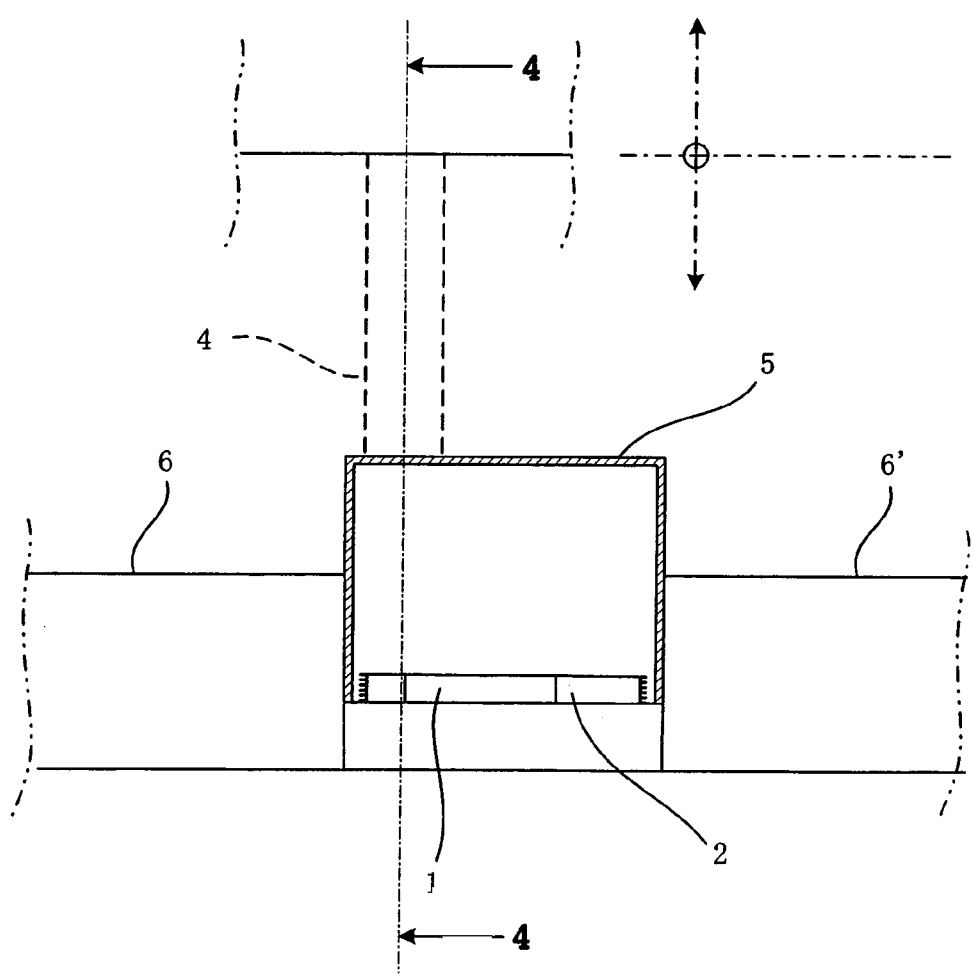
FIG. 3 is a longitudinal cross-sectional view showing the vicinity of the manhole when segments are coupled in the circumferential direction.
Figure 4:
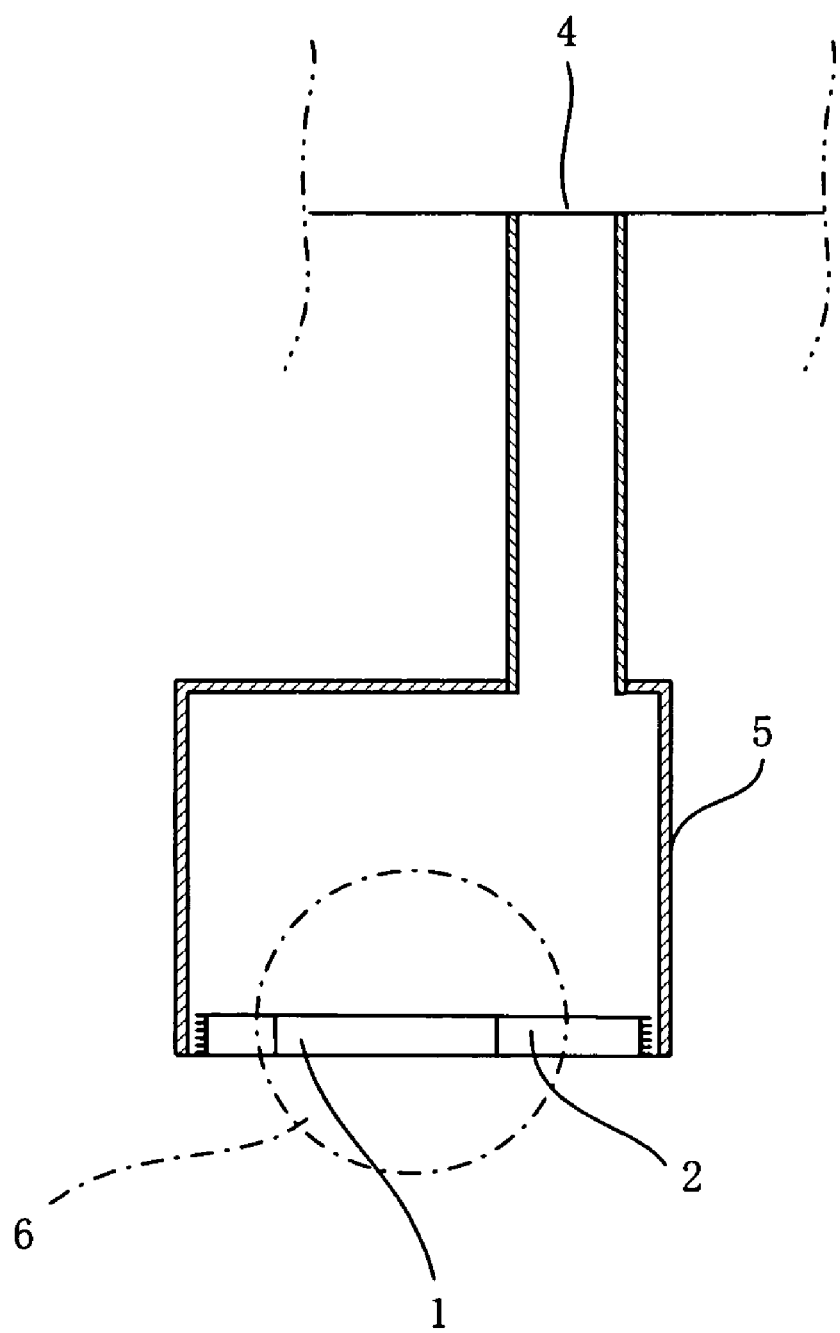
FIG. 4 is a cross-sectional view taken along the line 4—4 in FIG. 3.

As shown in FIG. 3 and FIG. 4, the segments 1, 2 are carried via a vertical hole 4 into a manhole 5 that communicates with main pipes 6, 6' and whose horizontal cross sectional shape is rectangular. Inside the manhole 5, the segments are coupled in the circumferential direction. At this time, the bent segments 2 are arranged at the four corners of the manhole 5, and each of the bent segments 2 is coupled with a parallelepipedic segment 1.

Figure 5:
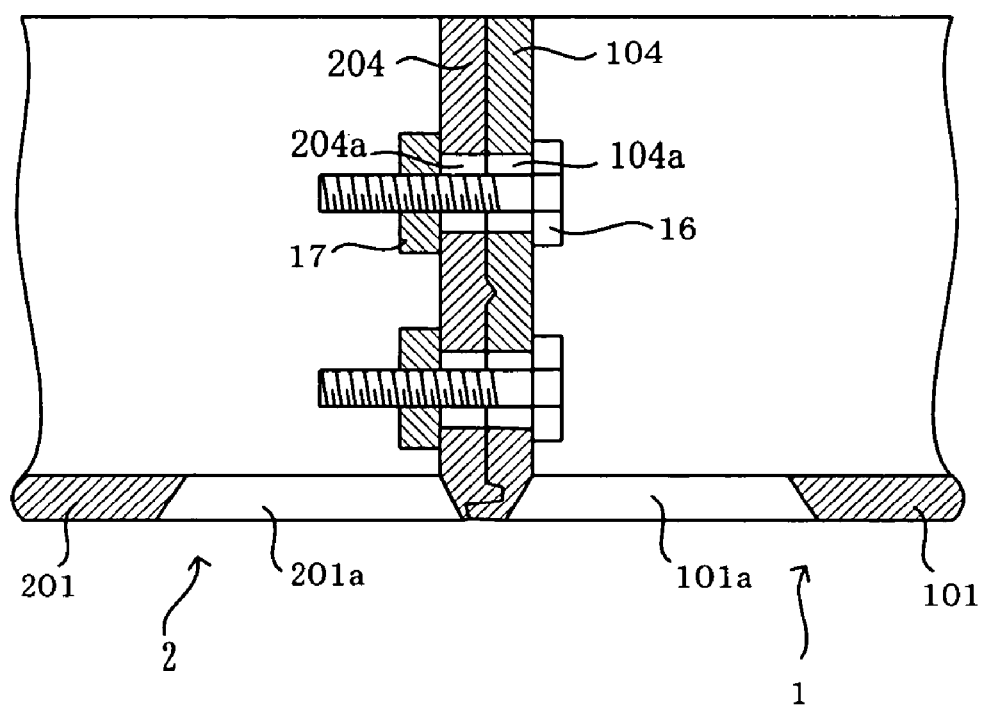
FIG. 5 is a cross-sectional view along the circumferential direction of the coupling portion that shows a state wherein the segments are mutually coupled in the circumferential direction.

This circumferential coupling is performed by, as shown in FIG. 5, tightly sealing the outer surfaces of the two end plates 104 and 204 of the respective segments 1 and 2; positioning so that the inner surfaces of the inner plates 101 and 102 form the same surface and so that the outer surfaces of all the side plates 102, 103 and 202, 203 align; inserting bolts 16 into the through holes 104a, 204a from the openings 101a in the inner plate 101 of the segment 1; screwing on nuts 17 inserted from the openings 201a in the inner plate 201 of the segment 2; and tightening both end plates 104, 204. When this coupling is completed, each of the openings 101a, 201a is tightly sealed by a cover (not shown) and the like.

The segments are thus coupled in the circumferential direction without any gaps to provide a closed short pipe unit. The thus assembled pipe unit has a shape sliced perpendicular to the vertical direction, as shown in FIG. 6.

Figure 6:
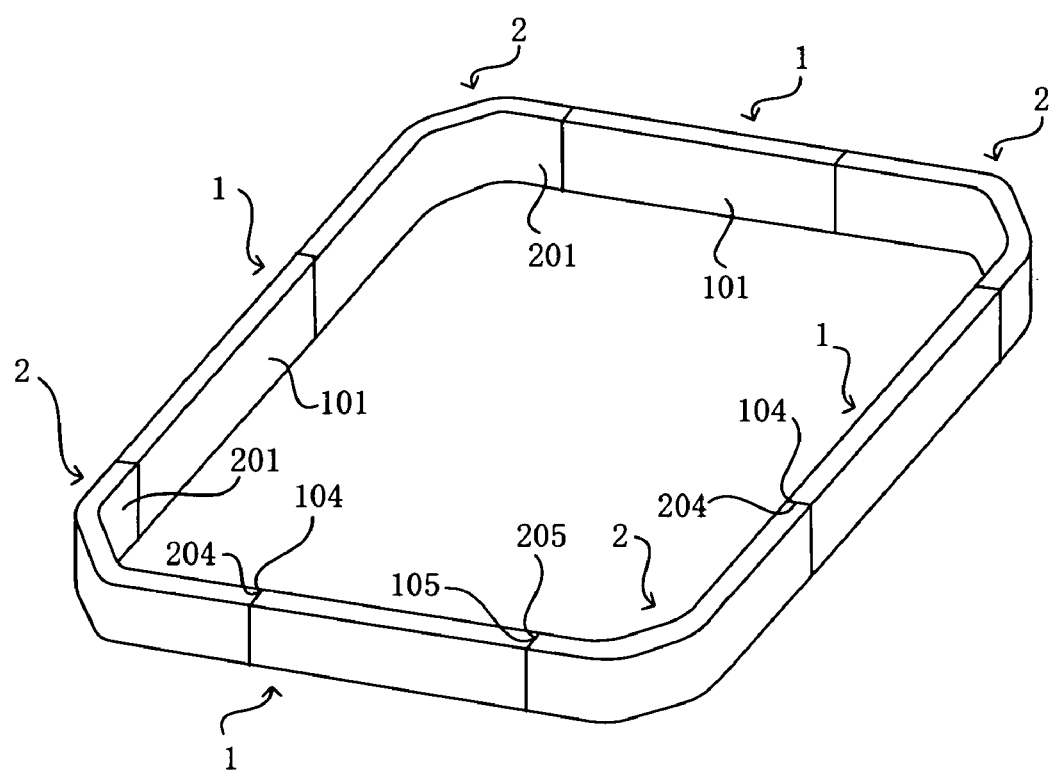
FIG. 6 is a perspective view that depicts a pipe unit obtained when the segments are coupled in the circumferential direction.

The closed pipe unit as shown in FIG. 6 constitutes the lowest level of the rehabilitating pipe, and segments are coupled in the vertical direction by successively stacking segments on top of it to form the rehabilitating pipe. If the pipe unit existing at this lowest level is not horizontal, then it can be leveled using a spacer and the like.

For vertical direction assembly, there are a method that uses coupling members, a method that stacks all of the segments using positioning members, and a method that uses both of these methods.

Figure 7:
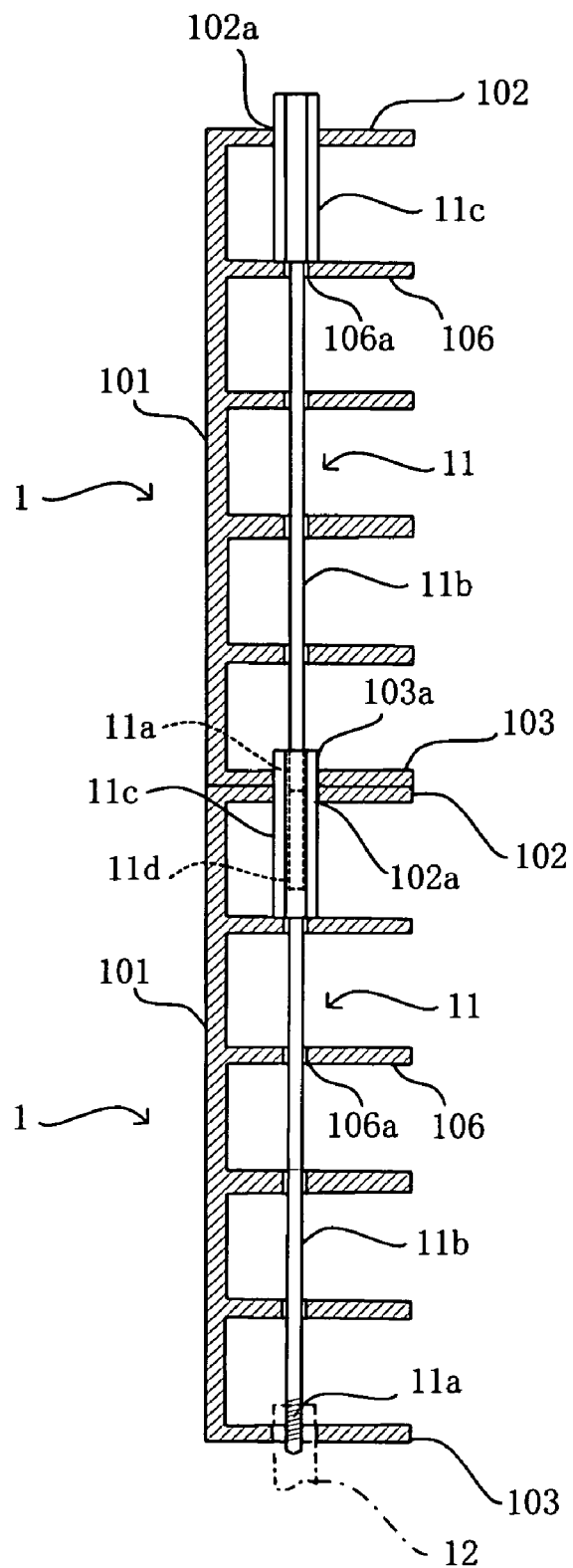
FIG. 7 is a cross-sectional view along the vertical direction that depicts a state wherein the segments are mutually coupled in the vertical direction by coupling members.

The method of using the coupling members is performed by using coupling members 11 made of metal and that each integrally joins a rod 11b with both ends, one end comprising a screw part 11a, and the other end comprising a nut part 11c wherein a screw hole 11d is formed into which the screw part 11a is screwed, as shown in FIG. 7.

In FIG. 7, the lower coupling member 11 is already joined to another coupling member 12, and is fixed to the lower segment 1. In this state, to couple another upper segment 1 to this lower segment 1 in the vertical direction, the surfaces of the side plates 102 and 103 of both segments 1, 1 are first tightly sealed with the inner surfaces of all the inner plates 101 aligned so that they are continuous and form a uniform surface. The nut part 11c protruding from the side plates 102 of the lower segment 1 is inserted into through holes 103a in the side plates 103 of the upper segment 1. An upper coupling member 11 is then inserted through from the through hole 102a of the side plate 102 of the upper segment 1, and the screw part 11a thereof is screwed into the screw hole 11d of the nut part 11c of the lower coupling member 11. When the nut part 11c of the upper coupling member 11 makes contact with the reinforcing plate 106 of the upper segment 1, the upper coupling member 11 clamps the upper segment 1 against the lower segment 1, thereby causing the upper and lower segments to be fixedly coupled. Because the coupling of every segment is performed using four coupling members per segment, the upper and lower segments are coupled rigidly in the vertical direction.

Furthermore, if the lower segment 1 is the lowest one in FIG. 7, then, as shown by a virtual line 12, the screw part that screws to the screw part 11a of the coupling member is fixed beforehand to the side plate 103 by some method.

Such circumferential and vertical coupling of the segments inside the manhole 5 is repeated until the coupled segments constitute a rehabilitating pipe of a desired height in the manhole 5.

Figure 8:
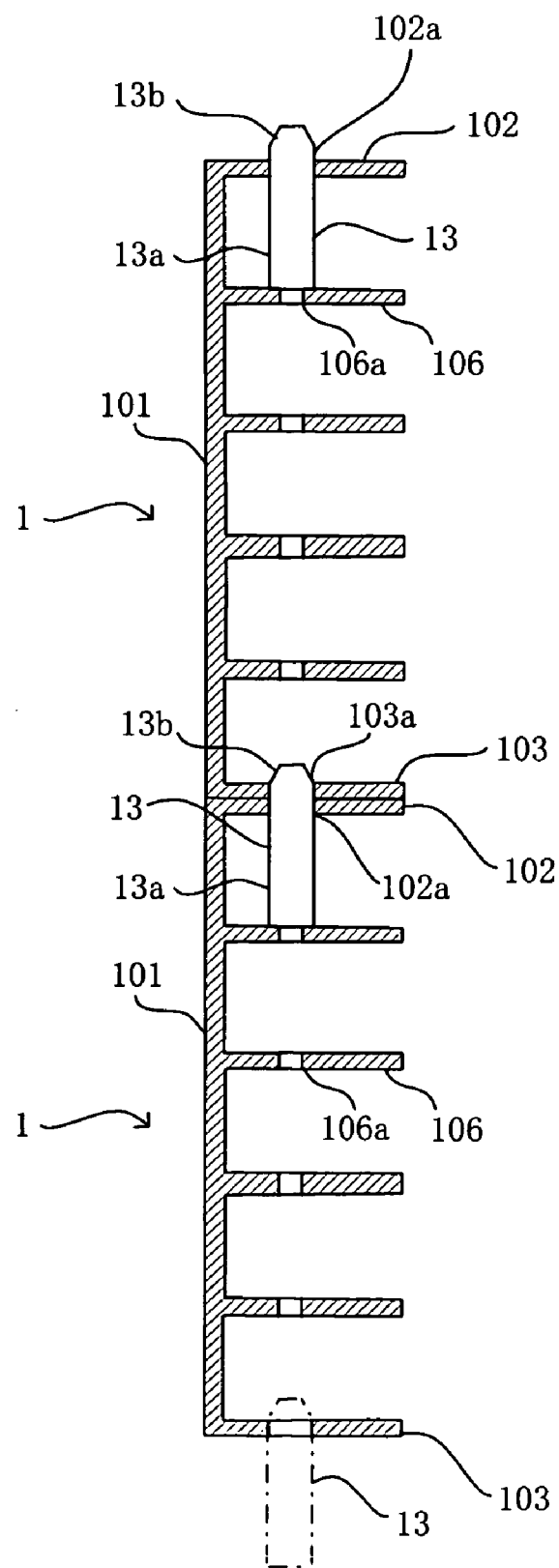
FIG. 8 is a cross-sectional view along the vertical direction that depicts a state wherein the segments are mutually positioned by the positioning members and coupled in the vertical direction.

As shown in FIG. 8, a segment can also be stacked, utilizing its own weight, in the vertical direction on a segment using positioning members. A positioning member 13 used in this method is made of plastic and comprises a cylinder part 13a and a conical cylinder part 13b continuous thereto; the cylinder part 13a has a diameter slightly less than a through hole 102a of the side plate 102 so that it is inserted thereto and tightly interfitted; and the length of the entire positioning member is such that the upper part of the cylinder part 13a and the conical cylinder part 13b protrude from the side plate 102 when the positioning member 13 is inserted until it contacts the reinforcing plate 106.

The coupling in the vertical direction is performed by first installing the positioning member 13 by inserting the positioning member 13 into the through hole 102a of the side plate 102 of the already installed lower (underlying) segment 1. Thus, a plurality of positioning members 13, preferably two to four, is used per segment. Assuming that the lower segment 1 shown in FIG. 8 is a segment already installed as a pipe in the manhole, the positioning members 13 are installed in this segment 1, and the upper and lower segments are mutually positioned so that the conical cylinder parts 13b protruding from the side plate 102 of the lower segment are inserted into the aligned through holes 103a of the lower side plate 103 of the other upper (overlying) segment 1.

Thus, the segments can be successively stacked on the lower level segments to provide the next pipe unit lying on the lowest pipe unit. Such processes are repeated until a rehabilitating pipe with a desired height is laid. This enables a rehabilitating pipe to be constructed with a low cost in a short period of time because no coupling member as shown in FIG. 7 is needed to couple the segments in the vertical direction.

Furthermore, it is also acceptable to make the positioning member so that it is integrally formed with the segment and not separate from the segment; in that case, it can be constituted so that, e.g., a positioning member having a shape that protrudes from the side plate 102 is integrally formed with the side plate.

In addition, instead of just simply stacking the segments, it is also acceptable to make it so that, after stacking, a stacked segment is coupled to the segment therebelow using a coupling member of the type shown in FIG. 7; in addition, it is also acceptable, after stacking a segment, to couple that segment to an assembled segment in the circumferential direction via a coupling means, such as a bolt and nut, as shown in FIG. 5. Such coupling of the segments in the circumferential direction and/or the vertical direction using the coupling member as shown in FIG. 5 and FIG.7 does not need to be performed for all the segments, and it may depend on the degree of damage of the inner wall surface of the manhole, or how it is damaged. Thus, by coupling assembled segments according to the state of the inner wall surface of the manhole in the circumferential direction and/or the vertical direction using coupling means as shown in FIG. 5 and FIG. 7, it is possible to increase the strength of the portion of the rehabilitating pipe corresponding to the inner wall surface of the manhole where the degree of damage is high.

Figure 9:
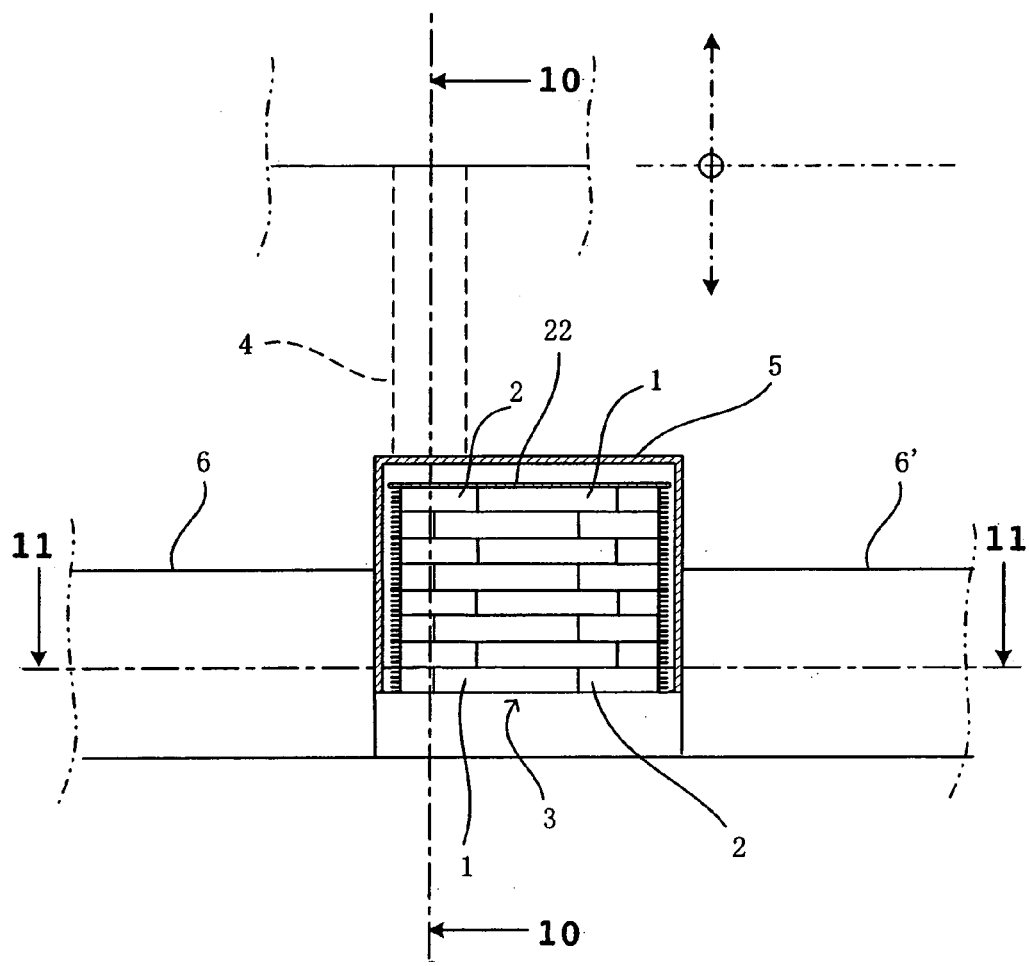
FIG. 9 is a longitudinal cross-sectional view showing the vicinity of the manhole when the segments are coupled as the rehabilitating pipe.
Figure 10:
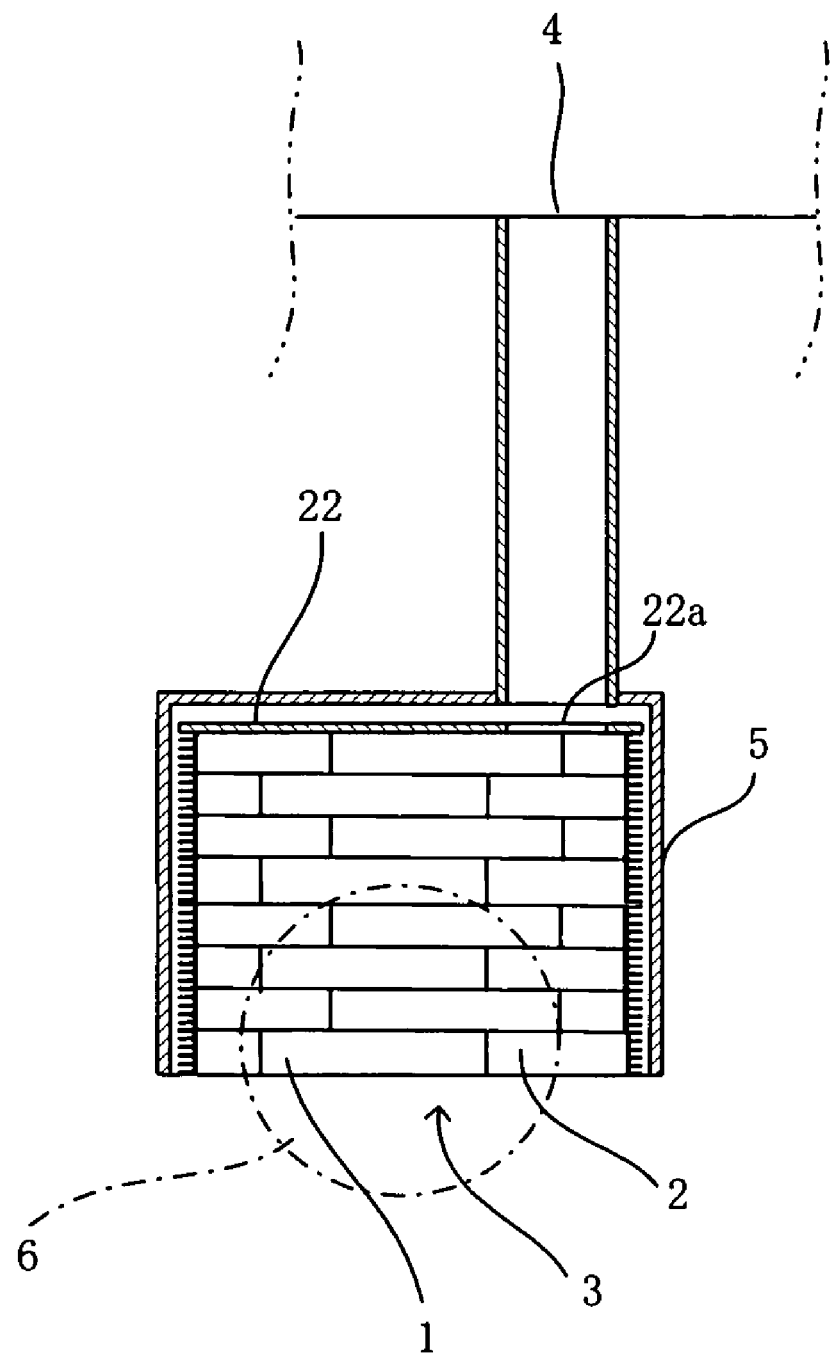
FIG. 10 is a cross-sectional view taken along the line 10—10 in FIG. 9.
Figure 11:
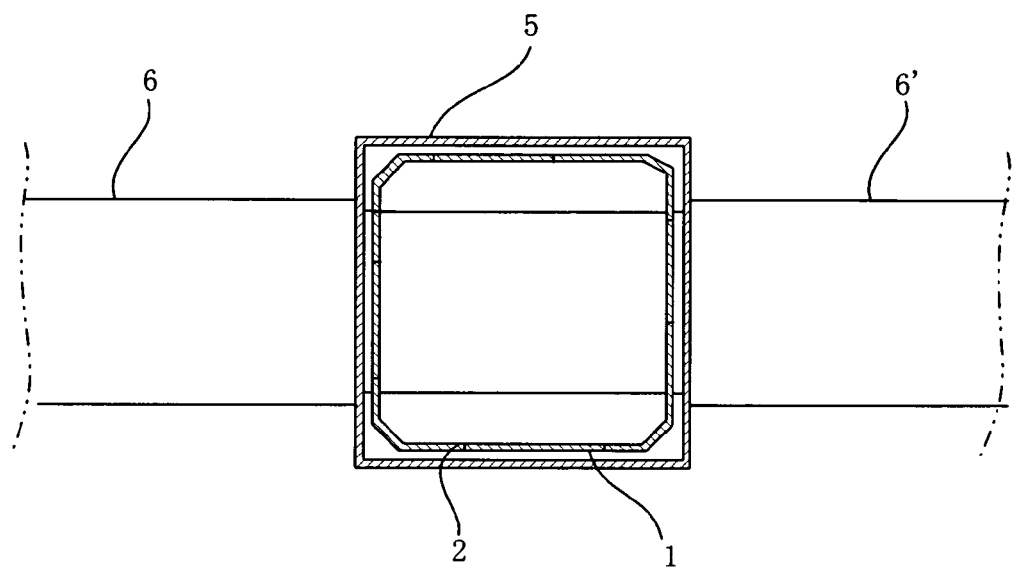
FIG. 11 is a cross-sectional view taken along the line 11—11 in FIG. 9.

The rehabilitating pipe thus assembled inside the manhole is illustrated in FIG. 9, FIG. 10 and FIG. 11. In these figures, the pipe unit shown in FIG. 6 is assembled in a state rotated by 90° about the pipe axis with respect to the underlying pipe unit, i.e., in a state wherein the end surfaces of all of the end plates are offset, but assembly can also be performed so that the end surfaces of all of the end plates of all of the segments are aligned. In that case, the same segments are stacked on the segments 1 (2) so that the surfaces of all the end plates align.

When the rehabilitating pipe is laid to the prescribed height, the upper part is covered with a cover sheet 22. This cover sheet 22 comprises, for example, a thermosetting reinforced plastic made of reinforced fibers impregnated with a thermosetting resin and a setting agent, and is constituted so that it is inserted via a gap above the interior of the laid rehabilitating pipe 3. For example, strip-shaped long cover sheets are lined up successively above the rehabilitating pipe, hardened, and joined mutually as well as to the rehabilitating pipe, thereby covering the entire upper part of the rehabilitating pipe. In that case, a hole 22a equivalent to the portion corresponding to the hole 4 is formed beforehand.

Thus, after completing the covering of the upper part of the rehabilitating pipe 3, a well-known method is used to fill the gap between the manhole 5 and the rehabilitating pipe (all of the segments) with a filler like grout, and harden the filler material to integrate the rehabilitating pipe with the manhole 5 as a compound pipe.

What is claimed is:

1. A method for rehabilitating an existing pipe that extends in the vertical direction, comprising the steps of:
    preparing segments each of which is integrally formed of plastic and has an inner plate having an inner surface that is flat or curved with a prescribed curvature, two side plates provided upright on each side edge of the inner plate, and two end plates provided upright on each end edge of the inner plate;
    successively coupling the segments, inside the existing pipe, in the circumferential direction and in the vertical direction to form a rehabilitating pipe, the segments being coupled in the vertical direction by stacking a segment on an underlying segment; and
    filling a gap between the existing pipe and the rehabilitating pipe with a filler for integration with the existing pipe.

2. A method according to claim 1; wherein the segments are successively coupled in the circumferential direction to form a horizontal pipe unit and the segments are successively stacked on the pipe unit to provide a next pipe unit thereon.

3. A method according to claim 1; wherein a one or more positioning members are used to position a segment to be stacked relative to the underlying segment when both the segments are coupled in the vertical direction.

4. A method according to claim 1; wherein a one or more coupling members are used to couple a segment to be stacked to the underlying segment when both the segments are coupled in the vertical direction.

5. A method for rehabilitating an existing pipe that extends in the vertical direction, comprising the steps of:
   preparing segments each of which is integrally formed of plastic and has an inner plate having an inner surface that is flat or curved with a prescribed curvature, two side plates provided upright on each side edge of the inner plate, and two end plates provided upright on each end edge of the inner plate;
   successively coupling the segments in the circumferential direction and in the vertical direction, the segments being coupled in the vertical direction by stacking a segment on an underlying segment and using a positioning member to position a segment to be stacked relative to the underlying segment when both the segments are coupled in the vertical direction; and
   filling, after assembly as a rehabilitating pipe, a gap between the existing pipe and the rehabilitating pipe with a filler for integration with the existing pipe.

6. A method for rehabilitating an existing pipe that extends in the vertical direction, comprising the steps of:
   preparing segments that can be coupled together in end-to-end relation to form closed pipe units that can be stacked one atop another to form a rehabilitating pipe;
   coupling some of the segments together, inside the existing pipe, in end-to-end relation to form a bottom closed pipe unit inside the existing pipe;
   coupling others of the segments together, inside the existing pipe, in end-to-end relation to form another closed pipe unit stacked atop the bottom closed pipe unit; and
   repeating the immediately preceding step a desired number of times with each successively formed closed pipe unit stacked atop a preceding closed pipe unit to form a rehabilitating pipe inside the existing pipe.

7. A method for rehabilitating an existing pipe that extends in the vertical direction according to claim 6; further including the step of filling a gap between the existing pipe and the rehabilitating pipe with a filler material.

8. A method for rehabilitating an existing pipe that extends in the vertical direction according to claim 7; further including the step of hardening the filler material to integrate the rehabilitating pipe with the existing pipe.

9. A method for rehabilitating an existing pipe that extends in the vertical direction according to claim 6; further including the step of positioning overlying segments of a closed pipe unit that is being formed relative to underlying segments of a previously formed closed pipe unit using positioning members inserted in aligned through-holes in the overlying and underlying segments.

10. A method for rehabilitating an existing pipe that extends in the vertical direction according to claim 9; further including the step of filling a gap between the existing pipe and the rehabilitating pipe with a filler material.

11. A method for rehabilitating an existing pipe that extends in the vertical direction according to claim 10; further including the step of hardening the filler material to integrate the rehabilitating pipe with the existing pipe.

12. A method for rehabilitating an existing pipe that extends in the vertical direction according to claim 6; wherein the preparing step includes preparing segments each of which is integrally formed of plastic and has an inner plate having an inner surface that is flat or curved with a prescribed curvature, two side plates provided upright on each side edge of the inner plate, and two end plates provided upright on each end edge of the inner plate.

* * * * *